Patented Dec. 26, 1950

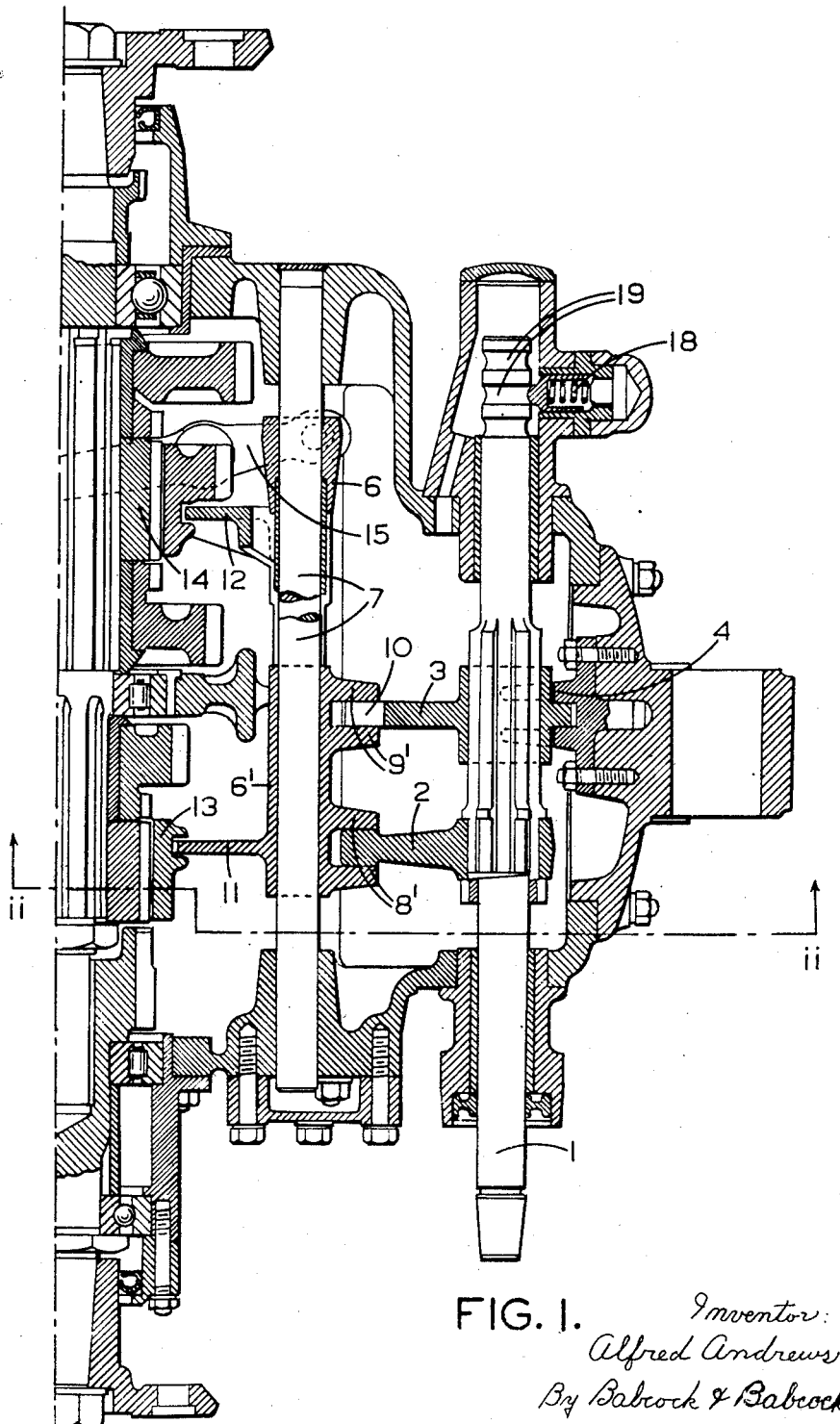
FIG. I.
Inventor:
Alfred Andrews
By Babcock & Babcock
Attorneys

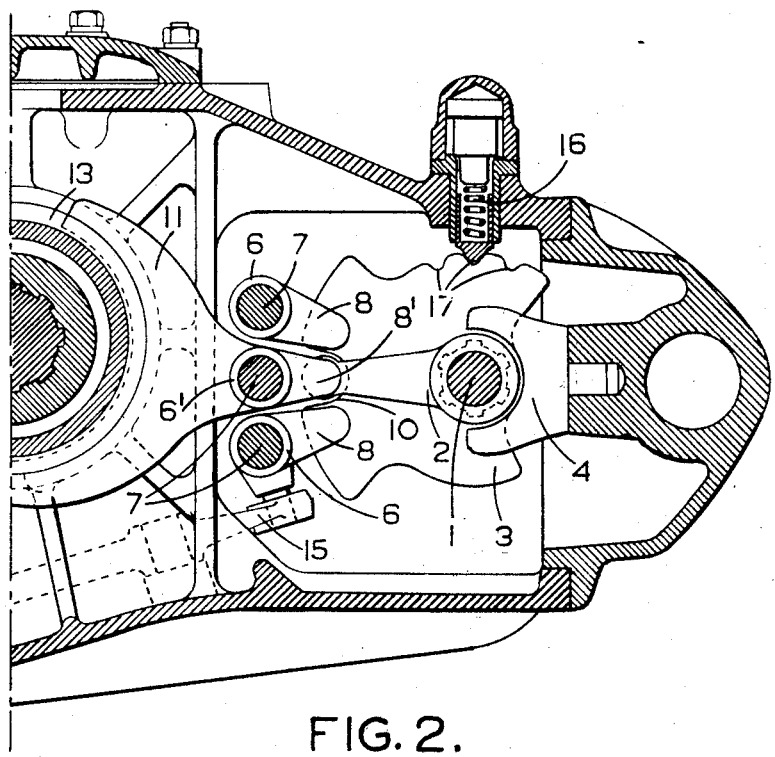

2,535,381

UNITED STATES PATENT OFFICE 2,535,381

CHANGE-SPEED MECHANISM

Alfred Andrews, Penn, Wolverhampton, England, assignor to Guy Motors Limited, Fallings Park, Wolverhampton, England Application August 20, 1946, Serial No. 691,804
In Great Britain August 29, 1945

2 Claims. (Cl. 74—473)

1

This invention relates to change speed mechanism of the countershaft type as commonly employed in the power transmission systems of motor vehicles, and more particularly to the kind in which change of speed is effected by mechanical means involving the use of an operating shaft having axial and angular movements one of which is for gear selection purposes and the other for gear engagement and disengagement purposes.

The object of the present invention is to simplify the manner in which, and to improve the means whereby, the movements of the operating shafts are utilised for their respective purposes.

The improved speed changing mechanism may be employed with the crash type of gear box, but it is designed more particularly for a change speed gear in which the gear couples are in constant mesh and in which one gear member of each couple is fixed to the counter-shaft and the other rotatably mounted on the mainshaft with a double-ended clutch member slidably arranged between each pair of gear members on the main shaft.

Referring to the drawings:

Figure 1 is a sectional part plan view of a constant mesh gear box employing gear change mechanism according to the present invention.

Figure 2 is a sectional view on the line ii—ii of Figure 1, and

Figure 3 is a diagrammatic perspective view of the operating shaft mechanism.

Referring to the drawings, the operating shaft 1 carries an arm 2, and a plate 3. The arm 2 is fixed to the shaft 1 and can move axially and radially therewith but the plate 3 is splined on the shaft 1 and is restrained by a yoke 4 so that it can move radially with the operating shaft 1 but not axially therewith.

The arm 2 and plate 3 engage sleeves 6 slidably mounted on guide rods 7 arranged parallel with the operating shaft 1, by means of pairs of lugs formed on the said sleeves. Thus pairs of operating lugs 8 are capable of being engaged by the arm 2 and pairs of selector lugs 9 are engaged by the plate 3.

The plate 3 is provided with an open slot 10 at a point corresponding with the angular position of the arm 2 so that on the operating shaft 1 being operated axially the sleeve $6^1$ is engaged by the arm 2 by reason of the pair of lugs $8^1$ and is permitted also to move axially, since the lugs $9^1$ thereof are able to move through the slot 10 in the plate 3. It will be observed particularly from Figure 3 that the sleeves 6 not engaged by

2 the arm 2, are prevented from axial movement by reason of the plate 3 engaging the pairs of lugs 9.

Striking forks 11, 12 are mounted on, or formed integral with their respective sleeves 6 and, as shown in Figures 1 and 2, engage the usual clutch members 13, 14 of the change speed mechanism.

Instead of a striking fork being formed on the sleeve a lever 15 may be pivotally attached thereto to effect operation of gear members on the other side of the box (not shown) such as reverse gears.

In use the operating shaft 1 is given a rotary movement by the usual gear lever to first select the gear desired. The correct radial position of the operating shaft 1 is determined by a spring loaded plunger 16 engaging notches 17 on the plate 3, Figure 2. This locating means may be in place of, or in addition to the usual gate associated with the gear lever.

With the operating shaft thus radially positioned for gear selection it will be seen, for example, from Figures 2 and 3 that the lugs $8^1$ of the sleeve $6^1$ are engaged by the arm 2 and the lugs $9^1$ register with the open slot 10 in the plate 3.

In order to effect gear engagement the operating shaft 1 is moved axially to an extent determined by the spring loaded plunger 18, Figure 1, engaging the annular recesses 19 on said shaft. Such axial movement of the operating shaft causes axial movement of the sleeve $6^1$ by reason of the arm 2 and hence the clutch member 13 is likewise moved by the striking fork 11, to effect gear engagement.

Engagement of any other gears at the same time is prevented by reason of the fact that their corresponding sleeves 6 are locked against axial movement by the plate 3.

I claim:

1. Change speed operating mechanism for gearing comprising in combination a gear box casing; a plurality of guide members mounted in said casing, said guide members being parallel to one another and in the same plane; a plurality of members slidably mounted on said guide members; gear striking forks connected to said slidably mounted members; operating members and selector members projecting from each of said slidably mounted members; a shaft slidably and rotatably mounted in said gear box casing; a selector plate mounted on said shaft for rotary movement therewith, said plate having a single gap therein and being disposed for engagement with the selector members not in axial alignment with said gap so that only a selector member disposed in axial alignment with said gap can pass therethrough; means maintaining said plate in fixed axial position in said casing; and a single operating arm secured to said shaft for axial movement and rotary movement therewith and in alignment with the gap of said plate to engage the operating members of the selected slidably mounted member for effecting the required gear change.

2. Change speed operating mechanism for gearing comprising in combination a gear box casing; a plurality of guide rods mounted in said casing; said guide rods extending parallel to each other, and in the same plane a plurality of sleeves slidably mounted on said guide rods; gear striking forks connected to said sleeves; operating lugs and selector lugs projecting from each of said sleeves; a shaft slidably and rotatably mounted in said gear box casing parallel with said guide rods; a selector plate mounted on said shaft and rotatable therewith, said plate having a single gap therein and being disposed for engagement with the selector lugs not in axial alignment with said gap so that only the selector lugs disposed in axial alignment therewith can pass through said gap; a yoke cooperating with said plate to prevent axial movement thereof in said casing; and a single operating arm secured to said shaft for axial and rotary movement therewith and in alignment with the gap of said plate to engage the operating lugs of the selected sleeve for effecting the required gear change.

ALFRED ANDREWS.

REFERENCES CITED

The following references are of record in the file of this patent:

UNITED STATES PATENTS

| Number | Name | Date |
| --- | --- | --- |
| 1,188,009 | Morton | June 20, 1916 |
| 1,321,087 | Church | Nov. 11, 1919 |
| 1,774,026 | Manville | Aug. 26, 1930 |
| 1,970,098 | Manville | Aug. 14, 1934 |